United States Patent [19]

Umeda

[11] 3,863,853

[45] Feb. 4, 1975

[54] ENDLESS MAGNETIC TAPE CARTRIDGE

[75] Inventor: Hiroyuki Umeda, Yokohama, Japan

[73] Assignee: Victor Company of Japan, Ltd, Yokohama, Kanagawa-ken, Japan

[22] Filed: Apr. 4, 1972

[21] Appl. No.: 240,965

[30] Foreign Application Priority Data

| | | |
|---|---|---|
| Apr. 6, 1971 | Japan | 46-24909[U] |
| Apr. 30, 1971 | Japan | 46-33597[U] |
| May 7, 1971 | Japan | 46-35758[U] |
| May 7, 1971 | Japan | 46-35759[U] |
| May 7, 1971 | Japan | 46-35760[U] |
| May 14, 1971 | Japan | 46-38193[U] |
| May 14, 1971 | Japan | 46-23818 |

[52] U.S. Cl. .......... 242/55.19 A, 360/93

[51] Int. Cl. .......... B65h 17/48

[58] Field of Search .......... 242/55.19 A, 55.19 R; 179/100.2 Z; 352/128; 360/93, 95; 274/4 B

[56] References Cited

UNITED STATES PATENTS

| | | | |
|---|---|---|---|
| 2,778,635 | 1/1957 | Eash | 242/55.19 A |
| 2,810,574 | 10/1957 | Daniel | 242/55.19 A |
| 2,908,769 | 10/1969 | Fonda | 242/55.19 A X |
| 3,235,195 | 2/1966 | Hebb et al. | 242/55.19 A |
| 3,252,670 | 5/1966 | Smith, II | 242/55.19 A |
| 3,591,100 | 7/1971 | Itoh | 242/55.19 A |
| 3,618,841 | 11/1971 | Browning | 242/55.19 A |

*Primary Examiner*—Billy S. Taylor

[57] ABSTRACT

An endless-tape cartridge comprises, essentially, a spool housing a wound body of an endless tape. A housing rotatably supports the spool. A tape outlet is provided at a high position on a side wall of the casing. A tape inlet is provided at a low position on a side wall of the casing. A portion of the endless tape is drawn from the center or innermost periphery of the wound body and guided out of the casing through the tape outlet. The tape travels obliquely relative to the rotating plane of a roating magnetic head of a video signal recording and reproducing apparatus. Thereafter, it is taken up into the casing through the tape inlet to be wound around the outermost periphery of the wound body.

4 Claims, 15 Drawing Figures

Fig. 11
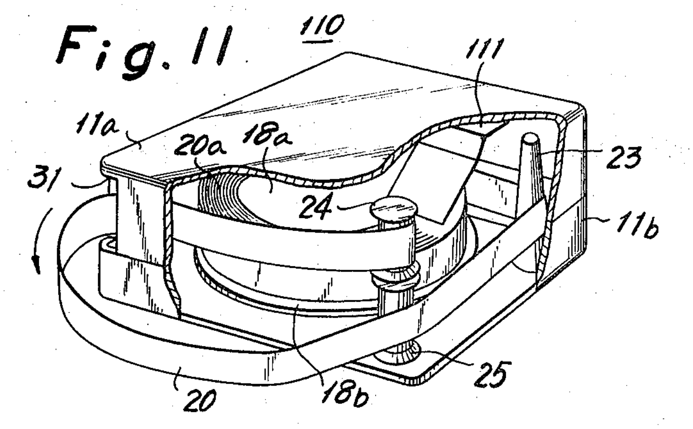
Fig. 12
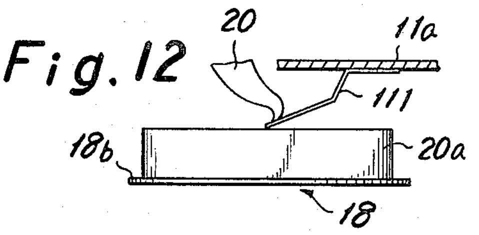
Fig. 13
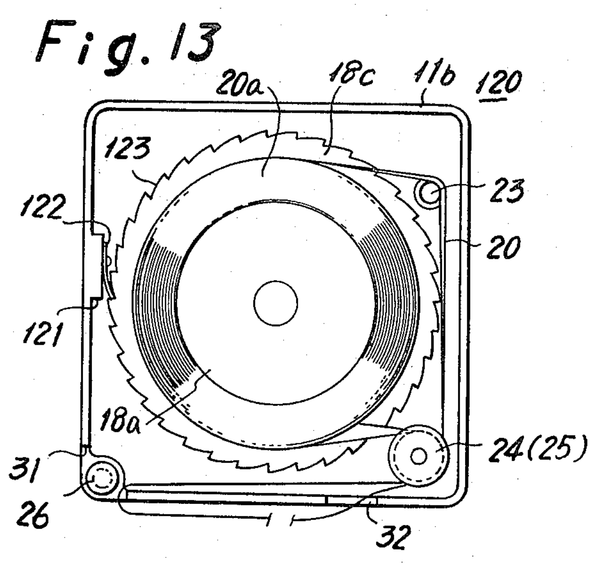
Fig. 14A Fig. 14B
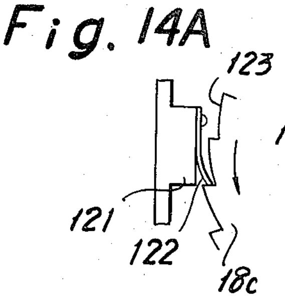
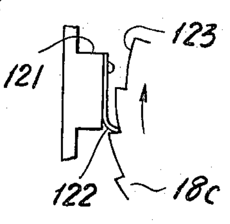

ENDLESS MAGNETIC TAPE CARTRIDGE

BACKGROUND OF THE INVENTION

This invention relates to an endless-tape cartridge for use in a video signal recording and reproducing apparatus and, more particularly, to a cartridge accommodating wound tape for use with such apparatus for recording video signals on and/or reproducing them from the magnetic tape. Signals are recorded in parallel tracks inclined with respect to the longitudinal direction of the tape.

In general, a known video signal magnetic recording and reproducing apparatus uses helical scanning (hereinafter abbreviated simply as VTR). The magnetic tape maintains, in the course of its travel, contact over a specific angle with a guide drum and, at the same time, an inclination with the rotating plane of a magnetic head. Accordingly, the height position of the magnetic tape part approaching the guide drum is different from that of the tape part departing from the guide drum. For this reason, a supply reel and a take-up reel of a conventional open reel type VTR are disposed at different height positions, no matter whether they lie in two parallel planes or inclined planes.

Endless-tape cartridges for use with audio signal recording and reproducing apparatuses have heretofore been manufactured. The conventional endless-tape cartridge are of such a structure that the tape outlet and the tape inlet are at the same height position. Therefore, the magnetic tape emerging from the tape outlet of the cartridge travels over a path in parallel with the bottom surface of the cartridge before it enters into the cartridge through the tape inlet.

Therefore, when a conventional endless-tape cartridge is used in a VTR apparatus, the tape path must be formed in a precise manner. The tape pulled from the cartridge casing changes its height position as it is passed around a guide drum obliquely. The tape leaving the drum changes its height position again until it is again at the initial height position where it enters the cartridge. In this case, the magnetic tape is subjected to an undue bending force in the width dimension and to a partial elongation. In extreme cases, the tape may break. For these reasons, conventional endless tape cartridges have been considered to be inapplicable to VTR apparatuses.

SUMMARY OF THE INVENTION

Accordingly, it is a general object of this invention to provide a novel and useful endless-tape cartridge for use in a VTR apparatus.

Another object of the invention is to provide an endless-tape cartridge which is usable in a recording and reproducing apparatus of a type wherein recording and reproducing involve an inclined path of the tape by a structural arrangement wherein a tape outlet and a tape inlet of different height positions are provided in the cartridge casing.

A further object of the invention is to provide an endless-tape cartridge in which the surplus tape outside of the cartridge casing can be taken rapidly and stably into the casing.

A still further object of the invention is to provide an endless-tape cartridge with a reverse rotation preventing mechanism for preventing unnecessary reverse rotation of the wound body of the endless tape at the time when the cartridge is not being used.

An additional object of the invention is to provide an endless-tape cartridge capable of being used for recording or reproducing operation in a VTR of the conventional open-reel type.

Other objects and features of this invention will be apparent from a consideration of the following detailed description in conjunction with the accompanying drawings.

BRIEF DESCRIPTION OF THE DRAWINGS

In the drawings:

FIG. 11 is a partly cut away, perspective view of an endless-tape cartridge constituting a third embodiment of this invention;

FIG. 12 is a diagrammatic side view of an essential part of the endless-tape cartridge shown in FIG. 11;

FIG. 13 is a plan view of an endless-tape cartridge constituting a fourth embodiment of this invention with the upper half of the casing removed; and FIGS. 14A and 14B are plan views showing an essential part of the endless-tape cartridge shown in FIG. 13.

DETAILED DESCRIPTION

Figure 1:
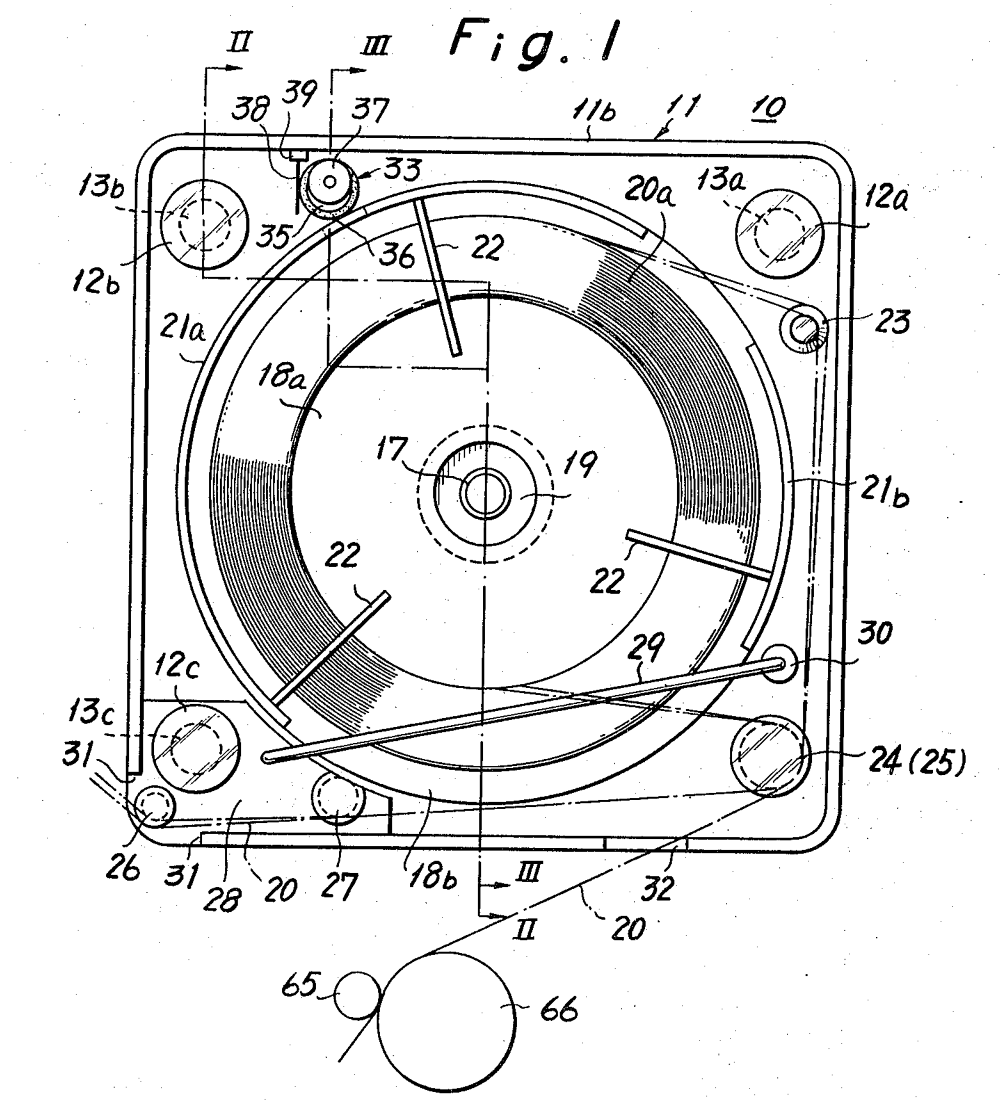
FIG. 1 is a plan view of an endless-tape cartridge constituting a first embodiment of this invention with the upper half of the casing removed.

An endless-tape cartridge, according to a first embodiment of this invention, is described below with reference to FIGS. 1 through 4. The endless-tape cartridge 10 is substantially composed of a upper half 11*a* of a casing and lower half 11*b* of a casing. The two halves 11*a* and 11*b* are assembled and held together by screws 13*a*, 13*b* and 13*c* threaded into assembly pillars 12*a*, 12*b* and 12*c*. In the central part of the lower half 11*b*, of the casing there is a raised part or a platform 15 with a recess 14 in its bottom surface, into which is inserted a reel engagement pin 51 of a take-up reel disc 50, when the cartridge 10 is mounted on the disc 50. In the central part of the platform 15, an opening 16 is provided for receiving a central cylinder 17 for supporting a reel shaft 52 of the reel disc 50. The reel engagement pin 51 does not make contact with the bottom surface of the lower half 11*b* and, therefore, the rotation of the reel disc 50 can never be transmitted to the cartridge 10.

Figure 2:
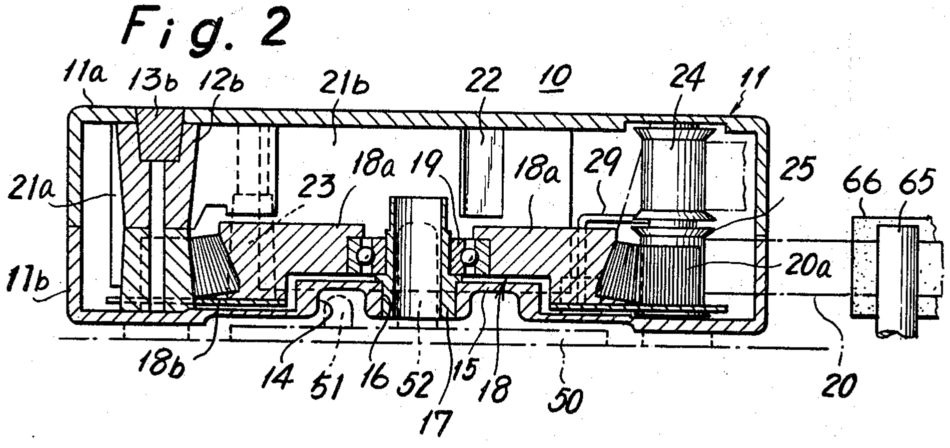
FIG. 2 is a sectional view, in elevation, taken along a plane indicated by line II—II in FIG. 1 with the upper half of the casing an assembled state.
Figure 3:
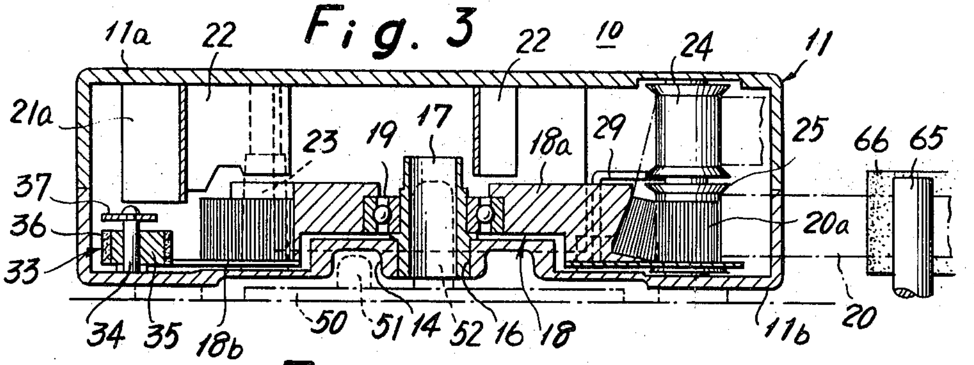
FIG. 3 is a sectional view, in elevation, taken along a plane indicated by line III—III in FIG. 1 with the upper half of the casing in an assembled state.

A spool 10 comprising a hub 18a and a flange 18*b* is rotatably mounted on the central cylinder 17 with the aid of a bearing 19. The mounted spool has a small clearance away from the floor surface of the casing lower half 11*b*. An endless magnetic tape 20 is wound on the external peripheral surface of the hub 18*a* and the body of wound tape 20*a* rests on the upper surface of the flange 18*b*. The hub 18*a* is made in the form of an inverted cone so that tape can be easily pulled out obliquely upward from the innermost turn or periphery of the wound tape body 20*a*. It is to be observed that the body of wound tape 20*a* is disposed in substantially the lower half of the casing 11 as indicated in FIGS. 2 and 3.

The upper half 11*a* of the casing is provided with cylindrical guides 21*a* and 21*b* which are rigidly mounted on the lower surface of the upper half 11*a*. Their axial lengths extend from the lower surface of the upper half 11*a* to a level in the vicinity of the external periphery of the flange 18*b* of the spool 18. On the inner peripheral surface of the cylindrical guides 21*a* and 21*b*, one or more projecting fins 22 are provided in such a manner that their lengths extend radially over the full thickness of the body of wound tape 20*a* and a part of the flange 18*a*, with a small clearance from the wound tape or the flange. These projecting fins prevent an upward displacement of the wound tape and the flange 18*a*. A conical guide pole 23 is provided at a position near the opposed ends of the guides 21*a* and 21*b*. The conical guide pole 23 has an upper cylindrical portion and a lower conical section with which the tape 20 comes into contact.

In one corner of the casing 11, there are provided a pair of cylindrical guide rollers 24 and 25, each with flanges at both ends, coaxially mounted on the same shaft in such a manner that they can rotate individually. The guide roller 24 is disposed at a position higher than the body of wound tape 20*a*, while the guide roller 25 is positioned at substantially the same height as the body of wound tape 20*a*. A guide pole with a tapered section may be substituted for the cylindrical guide roller 24.

In another corner of the casing 11, there is provided a cylindrical or a conical guide pole 26. Between the guide pole 26 and the guide roller 24, a cylindrical and flanged guide pole 27, is provided for determining a proper height position of the magnetic tape. This guide pole 27 may be omitted. The guide poles 26 and 27 are rigidly fixed to the lower surface of the top plate of the upper half 11*a* of the casing and are at the same height as the guide roller 24. The lower ends of the guide poles 26 and 27 come into contact with the upper surface of a shelf 28 provided on the wall surface of the lower half 11*b*. One end of a guide bar 29 is rigidly fixed to a fixing member 30 provided on the bottom plate of the lower half 11*b*, and the opposite end is rigidly fixed to the upper surface of the shelf 28. The guide bar 29 extends over the body of wound tape 20*a*, maintaining a small clearance from the surface of the wound tape.

Figure 4:
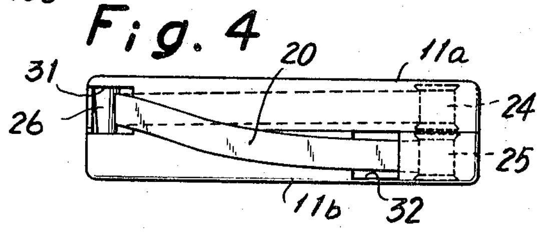
FIG. 4 is a front view of the endless-tape cartridge shown in FIG. 1 with the upper half of the casing in an assembled state.

As illustrated in FIGS. 1 and 4, a tape outlet 31 is provided in the side wall of the upper half 11*a* of the casing in the vicinity of the guide pole 26. A tape inlet 32 is provided in the side wall of the lower half 11*b* of the casing in the vicinity of the guide roller 25. As will be evident from FIG. 4, the tape outlet 31 is positioned higher than the tape inlet 32. Part of the endless magnetic tape 20 wound on the hub 18*a* is pulled out obliquely upward from the innermost turn or periphery of the body of wound tape 20*a* and is passed around the guide roller 24 via the guide bar 29 and around the guide poles 27 and 26. Then the tape is brought outside of the casing 11 via the tape outlet 31 and then reintroduced into the casing via the tape inlet 32, its height position having been changed. Then it is passed around the guide roller 25 and the guide pole 23 to be wound on the outermost turn or periphery of the body of wound tape, whereby a tape loop is completed.

An eccentric roller 33 (FIG. 1) is provided in such a position that, as it rotates, it can engage with the external periphery of the flange 18*b*. The eccentric roller 33 is rotatably mounted on a shaft 34 imbeddedly fixed to the bottom plate of the lower half 11*b* of the casing. The eccentric roller 33 comprised an eccentric roller body 35 and a brake drum 36 made of a material having a large coefficient of friction, such as rubber, fitted and fixed around the eccentric roller. The eccentric roller 33 is prevented from slipping off the shaft 34 by a washer 37. A leaf spring 38 is provided in close proximity to the eccentric roller 33. With one end fixed to a lug 39 provided on a wall of the lower half 11*b*, the leaf spring 38 is so disposed as to be capable of coming into contact with the eccentric roller 33. The large diameter part of the eccentric roller 33 is disposed on the left side of the contact point between the eccentric roller 33 and the flange 18*b* as viewed in the drawing.

The manner in which an endless-tape cartridge 10, with the above described construction, is used with an open reel type VTR will be described with respect to an actual embodiment in conjunction with FIGS. 5 and 6.

First, the ordinary take-up reel of the open-reel type VTR 53 is removed. In its place, an endless-tape cartridge 10 is mounted on the take-up reel disc 50. In this case, the parts are so adapted that the lower surface of the cartridge 10 does not come into direct contact with the upper surface of the take-up reel disc 50. An inclined deck 55*b* has the supply reel disc mounted thereon for receiving a supply reel 54 (for the open reel type), as shown in FIG. 6. The inclination is with respect to a deck 55*a* on which the take-up reel disc is rotatably provided. As mounted, the endless-tape cartridge 10 must be so oriented that the tape outlet 31 confronts a point in the vicinity of the lowest position of the deck 55*b*.

The part of the magnetic tape 20 emerging from the tape outlet 31 of the cartridge 10 is pulled out and passed around the external peripheral surface of a reel hub 85 of an empty supply reel 54 so as to produce contact around a predetermined arc of contact at a specific angle. At the same time, it is installed along the regular tape path of the VTR. The tape passsed around the reel hub 85 of the supply reel 54 is also passed by a tension pole 56, a guide pole 57, a full-width erasing head 58 and a guide pole 59, and passed around a guide drum 60 incorporating a rotating magnetic head (not shown) for a predetermined range (slightly more than 180° in case of two rotary magnetic heads) and helically to the rotating plane of the rotating magnetic head. The magnetic tape 20 that has been detached from the guide drum 60 is guided to a guide pole 61 and passes by a partial erasing magnetic head 62, a control signal recording and reproducing head 63 and an audio signal recording and reproducing head 64, and is driven by a capstan 65 and a pinch roller 66. Then the tape 20 is sent into the casing 11 through the tape inlet 32 of the endless-tape cartridge 10.

Differing from an open reel type VTR, the VTR 53 is provided with a skew distortion compensation mechanism as described hereinafter. The tension pole 56 (FIG. 5) is fixed at one end of a lever 68. The other end of the lever is pivotally supported by a pivot pin 67. A band brake 70, in an arc shape, is spanned from an intermediate position on the lever 68 and to a fixing point of the chassis base, in such a manner that the external circumference of disc 69 provided beneath the supply reel disc is surrounded by the arc of the band brake. A spring 73 is spanned from one end of a lever 68 to one end of a bell crank 72 mounted on a pivot pin 71. A pin 74 imbeddedly fixed to the other end of the lever 72 engages with an engagement member 75 provided at the lower portion of a knob 76. The lever 68 is urged to swing clockwise responsive to the tension of a spring 73. The band brake 70 receives a force for contacting the external peripheral surface of the disc 69 from the spring 73. By suitably turning the knob 76, the rotating position of the lever 72 can be adjusted, whereby the contacting force of the band brake 70 for the disc 69 can be adjusted.

On the panel surface of VTR 53, there are provided a power supply switch 77, a tracking volume 78, a video recording switch 79, an after-recording switch 80, an electronic editing switch 81, an auxiliary control lever for fast forward and still reproduction 82, a main control lever 83, a tape counter 84, etc.

After the magnetic tape 20 emerging from the casing 11 of the endless tape cartridge 10 has been settled along the above mentioned tape path, the main operating lever 83 is operated to place the VTR 53 in the reproduction mode of operation. Then the capstan 65 starts to rotate by receiving a rotational torque from a motor (not shown). The pinch roller 66 comes into pressure contact with the capstan 65 with the magnetic tape 20 interposed therebetween. The magnetic tape 20 is driven by the capstan 65 and the pinch roller 66 in the direction indicated by the arrow (FIG. 5). Although the supply reel disc 50 rotates for the reproduction operation, the engagement pin 51 does not come into contact with the casing 11'. The reel shaft merely revolves in the cylinder 17. Therefore, the rotation of the supply reel disc 50 is not transmitted to the endless-tape cartridge 10.

As the magnetic tape 20 is driven by the capstan 65 in the direction of the arrow, the magnetic tape 20 wound on the hub 18*a* is unwound from the innermost turn or periphery of the body of wound tape 20*a* in the cartridge 10. The tape emerges through the tape outlet 31 to the outside of the casing 10 via the guide roller 24 and the guide poles 27 and 26. Then, the tape is wound on the hub 85 of the supply reel 54. The tape travels along the regular tape path on the panel of the VTR and enters into the casing 11 through the tape inlet 32. The tape 20 that has emerged from the outlet 31 of the tape casing 11 is raised in its height to a position where it is in contact with the supply reel 54, but the height position is gradually lowered towards the guide drum 60 to bring the tape into contact obliquely with the drum. The magnetic tape that has been detached from the guide drum 60 maintains the same height position until it reaches the tape inlet 32 which is situated lower than the tape outlet 31. Therefore, the tape 20 can be supplied, driven along the regular tape path, and sent into the casing smoothly without the possibility of an undue force being applied thereto.

As the magnetic tape 20 travels along the guide drum 60, video signals are reproduced. On entering into the casing 11 through the tape inlet 32, the tape 20 is wound on the outermost turn or periphery of the wound tape body 20*a* via the guide roller 25 and the guide pole 23. As the magnetic tape 20 is pulled out, as mentioned previously, from the innermost turn of the body of wound tape, the wound tape 20*a* is caused to rotate counterclockwise together with the spool 18. By this rotation of the body of wound tape 20*a*, the magnetic tape 20 that has reached the external circumference of the wound tape is wound on its outermost turn or periphery.

When skew distortion is noted in the reproduced picture, the knob 76 must be suitably turned for adjustment. If the knob 76 is turned counterclockwise, the bell crank 72 is caused to turn clockwise, whereby the spring 73 is pulled and the lever 68 is caused to turn clockwise. Thus the press-contacting force of the band brake 70 against the disc 69 is increased, that is, the braking force for rotation of the supply reel 54 is increased.

No positive rotational force is transmitted to the supply reel disc on which the supply reel 54 is mounted. The supply reel 54 is caused to rotate together with the supply reel disc by a frictional force produced between the magnetic tape 20 and the reel hub 85, which is produced as the tape travels. Accordingly, the frictional force between the hub 85 and tape 20 increases with the braking force of the band brake which is imparted to the disc 69, resulting in an increase in the back tension with respect to the magnetic tape 20. In order to decrease the back tension for the magnetic tape, it is necessary to turn the knob in clockwise direction. Thus, the back tension can be adjusted by turning the knob and utilizing the supply reel 54. The skew distortion in the reproduced picture can be thus corrected. Incidentally, temporary variation in tape tension in course of travel of the magnetic tape 20 is detected by the tension pole 56, whereby the lever 68 is caused to turn, and control operation is carried out to make the tape tension constant.

Thus, by merely providing a braking adjustment mechanism for the supply reel 54 of a conventional open reel type VTR, the back tension can be adjusted by utilizing the supply reel 54. Since installation of a back tension adjusting mechanism in the endless-tape cartridge is thereby unnecessary, the cartridge 10 can be made extremely compact.

In the VTR of the above described embodiment, the deck 55*b* on which the supply reel 54 is mounted is inclined relative to the deck 55*a*. However, VTR should not be limited to this arrangement. It may be of the so-called parallel-deck type wherein the deck 55*b* is parallel to and in a position higher than the deck 55*a*. However, if a VTR of the so-called inclined deck type and an endless-tape cartridge 10 are used, as indicated in FIG. 5, the tape outlet 31 is confronting the nearest position of the inclined deck 55*b*. For this reason, the magnetic tape which has emerged from the tape outlet 31 can be directed upward as it is and wound around the supply reel 54. Moreover, the cartridge casing 11 can be made thin. If the endless-tape cartridge 10 is used in a parallel deck type VTR, it is necessary to make the thickness of the cartridge casing 11 approximately 3/2 times that of a cartridge used in an inclined deck type VTR.

Figure 5:
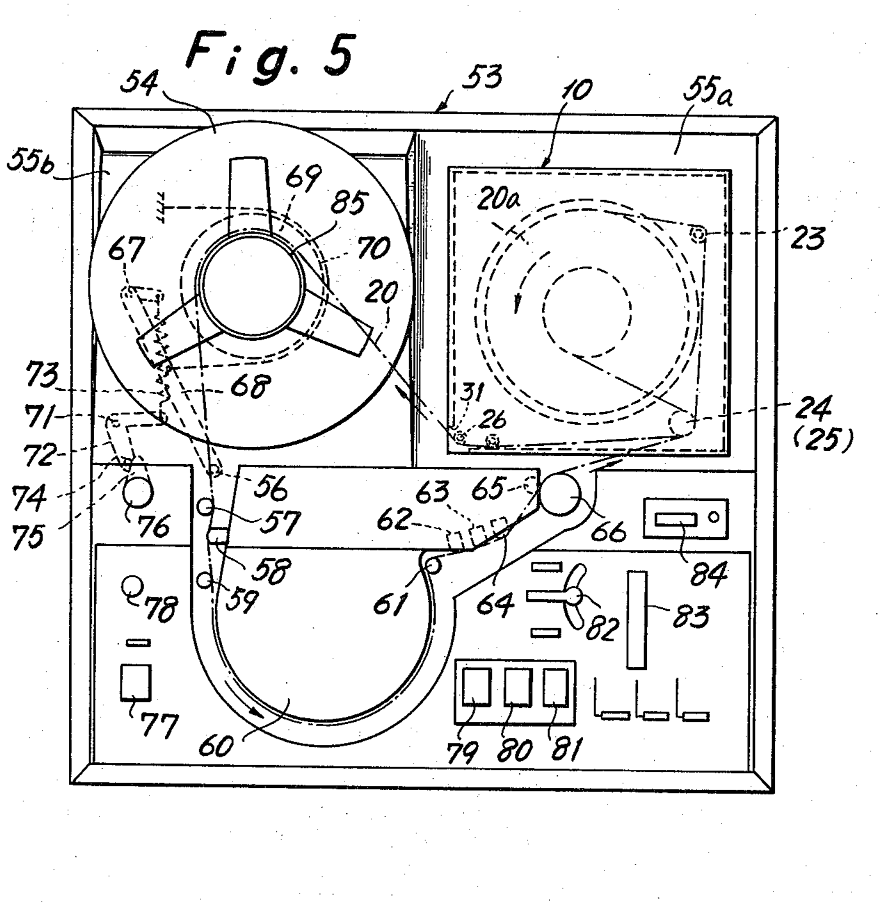
FIG. 5 is a plan view of a conventional open reel type VTR with the endless-tape cartridge shown in FIG. 1 used therein.
Figure 6:
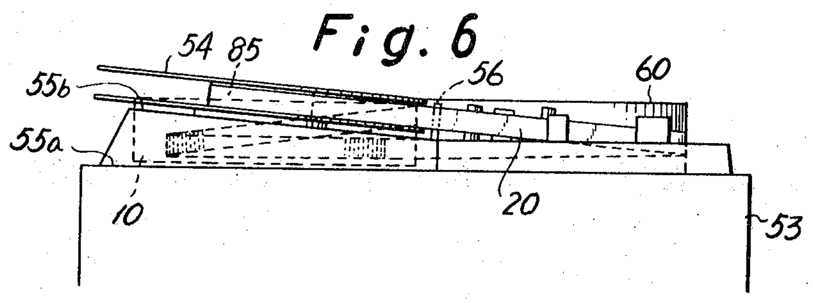
FIG. 6 is a left side view of the VTR shown in FIG. 5.
Figure 7:
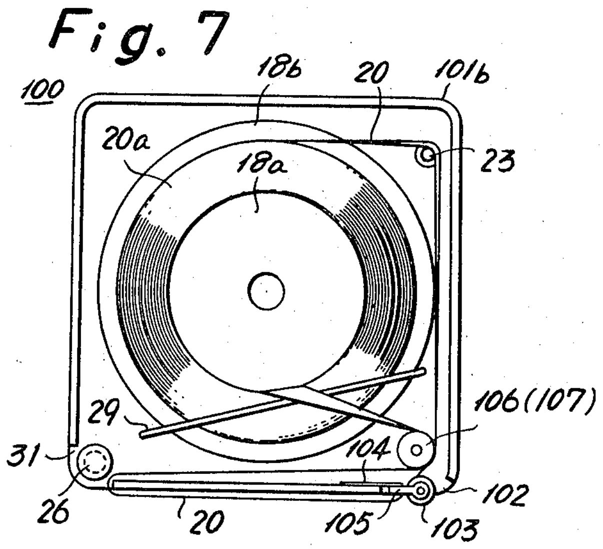
FIG. 7 is a plan view of an endless tape-cartridge constituting a second embodiment of this invention with the upper half of the casing removed.
Figure 8:
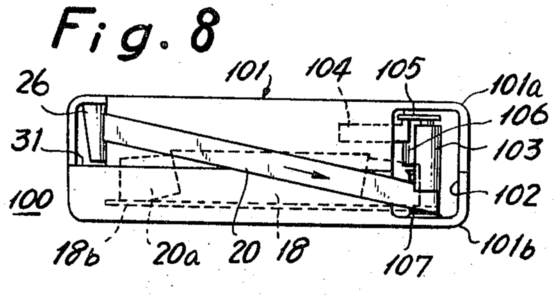
FIG. 8 is a front view of the endless-tape cartridge shown in FIG. 7 with the upper half of the casing installed.

At the time of reproduction of the magnetic tape 20 (similarly at the time of recording), the tape travels in the direction indicated by the arrow in FIG. 5. The body of wound tape 20*a* within the cartridge 10, together with the spool 18, are rotated in the counterclockwise direction. When the spool 18 rotates in the counterclockwise direction, the outer peripheral edge part of its flange 18*b* contacts the outer cylindrical surface of the brake drum 36 of the eccentric roller 33 and rotates the same slightly in the clockwise direction. Consequently, the eccentric roller 33 at its part of small diameter confronts the flange 18*b*. The outer cylindrical surface of the brake drum 36 assumes a state of being spaced apart from the flange 18*b*. That is, when the flange 18*b* is rotating in the counterclockwise direction, the eccentric roller 33 tends to separate away. For this reason, the eccentric roller 33 does not apply a braking force with respect to the flange 18*b*, and the spool 18 rotates smoothly in the counterclockwise direction. The magnetic tape 20 is thereby sent out smoothly from the body of wound tape 20*a* and, at the same time, wound therearound. The eccentric roller 33 rotated in the clockwise direction as mentioned above is engaged by the leaf spring 38 and prevented from rotating unnecessarily. The brake drum 36 is held in a state wherein its outer cylindrical surface is in very light contact with the outer surface of the flange 18*b*.

When the cartridge 10 is in an unused state, removed from the VTR 53, the magnetic tape 20 on the side of the tape inlet 32 may be pulled for any reason or by error. A torque in the clockwise direction will be applied to the wound tape body 20*a* and the spool 18. When the spool 18 is thus urged to rotate in the clockwise direction, the brake drum 36 of the eccentric roller 33 lightly contacting the spool 18 is rotated in the clockwise direction. Accordingly, the eccentric roller 33 at its large-diameter part tends to press against the flange 18*b*. The brake drum 36 tends to bite in with respect to the rotation of the flange 18*b*. For this reason, the brake drum 36 imparts a powerful braking force with respect to the flange 18*b*, thereby braking the rotation of the spool 18.

Since the diameter of the flange 18*b* is much greater than the diameter of the eccentric roller 33, a very slight rotation of the spool 18 is sufficient to cause the braking force to be applied to the spool 18, promptly and positively. For this reason, the spool 18 and the wound tape body 20*a* are not rotated in the direction opposite or reverse to the counterclockwise direction which is the normal rotational direction. In general, since the tape cannot be body of wound into the innermost periphery of the wound tape 20*a*, the tape breaks when the body of wound tape is rotated in the direction reverse to the normal rotational direction. In the above described cartridge 10, however, the reverse rotation of the wound tape body is effectively prevented, whereby there is little possibility of tape breakage.

A second embodiment of the endless-tape cartridge according to the invention will now be described with reference to FIGS. 7 through 10.

Upon completion of the reproduction of the recording of the endless-tape cartridge in the above described VTR, the cartridge is disconnected and removed from the VTR. It is then necessary to retract and to accommodate within the casing the surplus magnetic tape formerly in the tape path in the VTR which is outside of the cartridge casing. If, the magnetic tape coming out of the tape outlet of the casing is pulled out to rotate the body of wound tape within the cartridge, the quantity of the tape wound onto the body of wound tape is greater than the quantity of tape drawn out of the body of wound tape because of the difference in the circumferential lengths of the innermost periphery and the outermost periphery of the body of wound tape, whereby the above mentioned surplus tape is progressively sent into the casing.

However, when the above described winding transfer of the tape due to the pulling out of the tape is carried out by hand, a considerable length of time is required to transfer all of the surplus tape into the casing. Moreover, variations occur in the winding force of the tape around the wound tape. Furthermore, there are other problems such as tape breakage in some cases due to sudden application of tension of the tape when it is pulled out. These problems have been solved in the tape cartridge of the present invention.

In FIGS. 7 through 10, parts which are the same as or equivalent to those in FIGS. 1 through 6 are designated by the same reference numerals, but description thereof will not be repeated. The casing 101 of the endless tape cartridge 100 is made up, essentially, of an upper half 101*a* and a lower half 101*b*. A tape outlet 31 is provide in the side flange wall of the upper half 101*a* at one corner thereof. When the upper and lower casing halves 101*a* and 101*b* are in an assembled state, a tape inlet 102 is formed near another corner of the casing 101. An idler 103 made of rubber is rotatably supported by a bracket member 105 fixed to the free end of a leaf spring 104 which is anchored at the other end thereof to the inner surface of the side flange wall of the casing upper half 101*a*. This idler 103 extends downward to an extent sufficient for making contact with a pinch roller 66 of the VTR 53 as described hereinafter.

The magnetic tape 20 which has been drawn out from the body of wound tape 20*a* is guided by a guide roller 106 of circular cylindrical shape. The magnetic tape 20 sent in through the tape inlet 102 is guided by a guide roller 107 disposed below the guide roller 106 and having a flange of a diameter selected to be less than the diameter of the guide roller 106. For this reason, when the idler 103 presses against the pinch roller 66 of the VTR as described hereafter, the idler 103 presses against only the guide roller 106. Other organizational features of the cartridge 100 are the same as those of the aforedescribed cartridge 10 and, therefore, will not be described again.

Figure 9:
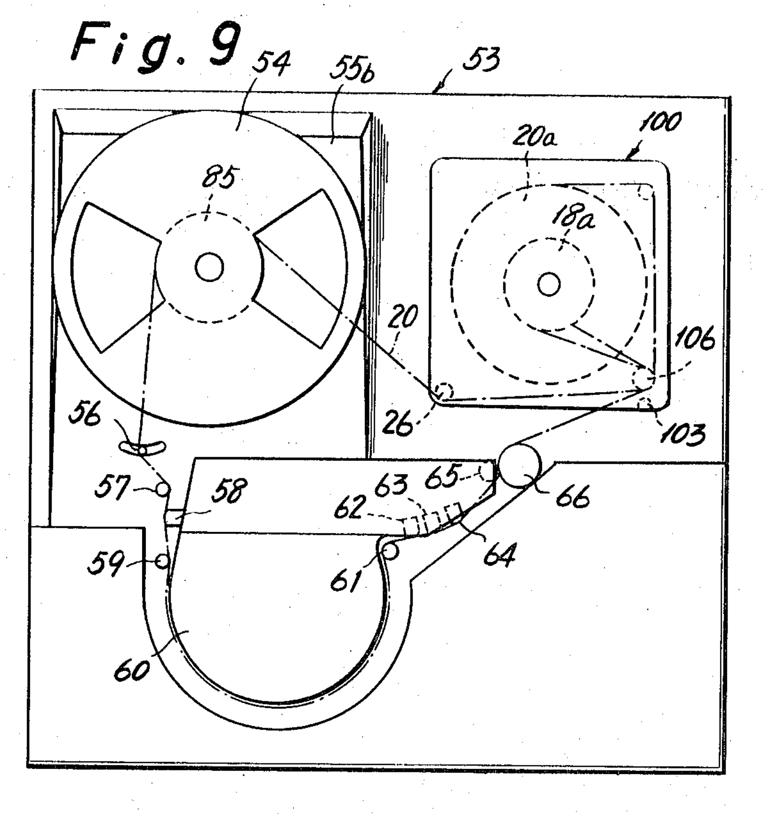
FIGS. 9 and 10 are views indicating the endless-tape cartridge illustrated in FIGS. 7 and 8 installed in a video tape recorder.

As shown in FIG. 9, the state of use of the above described endless-tape cartridge 100 at the time of reproduction or recording is similar to that in the case of the endless-tape cartridge 10 described hereinbefore in conjunction with FIG. 5. More specifically, the magnetic tape 20 which has been sent out through the tape outlet 31 at a high position of the casing 101 of the cartridge 100, is wound to some extent around the hub of the supply reel 54. Then it passes along the same tape path as that described previously with reference to FIG. 5. The tape 20 then enters the casing 101 through the tape inlet 102 and, guided by the guide roller 107, is wound around the outer circumferential surface of the wound tape body 20*a*. At this time, the idler roller 103 is separated from the outer surface of the guide roller 106 by the force of the leaf spring 104 and, therefore, cannot obstruct the sending out of the tape.

Figure 10:
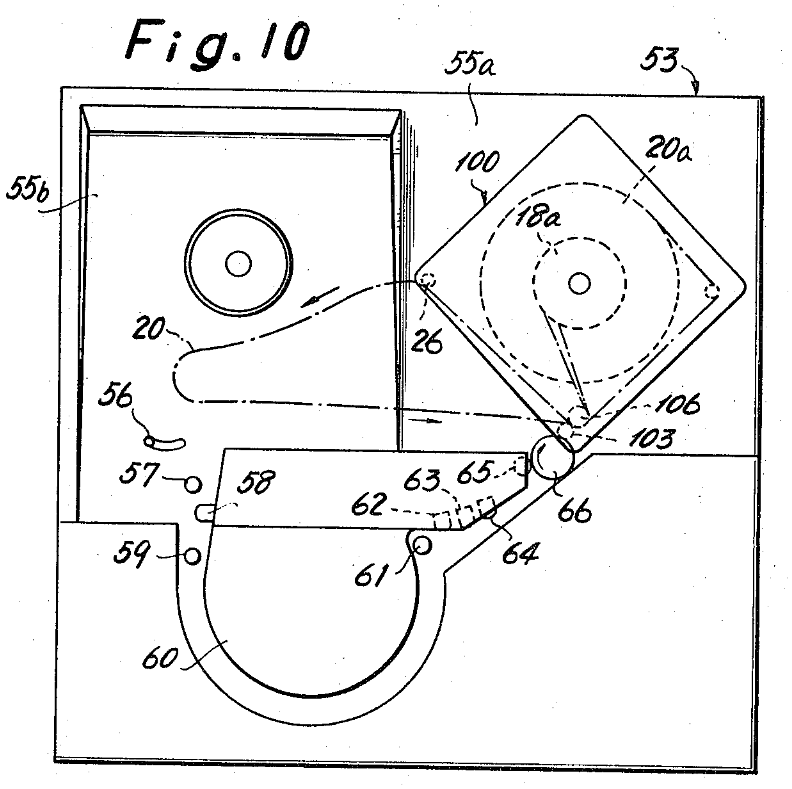

Next, upon completion of the reproduction or recording of the endless tape of the cartridge 100, the surplus tape which is then outside of the casing 101 is taken up therein in the following manner. First, the VTR 53 is placed in a stopped state, and the magnetic tape 20 outside of the casing 101 is removed from the operational tape path. At the same time, the supply reel 54 is dismounted from the deck 55*b*, and, as indicated in FIG. 10, the surplus tape is placed in a suitable position on the decks 55*a* and 55*b* where there are no projecting parts of other mechanisms. The VTR 53 is then placed again in its state for recording or reproducing, whereupon the capstan 65 rotates, and the pinch roller 66 is pressed against the capstan 65 and thereby rotates.

With these various parts in the state described above, the cartridge case 101 is rotated clockwise through approximately 45° from the state indicated in FIG. 9 to that indicated in FIG. 10, and the idler 103 is pressed into contact against the pinch roller 66. At this time, a portion of the pinch roller 66 enters into the casing 101 through the tape inlet 102. The idler 103, still pressed against the pinch roller 66, is displaced counter to the force of the leaf spring 104 and presses against the guide roller 106 over the magnetic tape 20 interposed therebetween. Consequently, the rotational torque of the pinch roller 66 thus being driven by the capstan 65 is transmitted to the idler 103, which thereupon rotates. The magnetic tape 20 clamped between the idler 103 and the guide roller 106 is driven in the direction of its discharge outside of the casing. As a result, the tape 20 is drawn out continuously from the innermost periphery of the body of wound tape 20*a*. As the tape 20 is thus drawn out, the body of wound tape 20*a* rotates in the counterclockwise direction, whereby the tape sent in through the tape inlet 102 is wound around the outermost periphery of the body 20*a*. As a result, the surplus tape outside of the casing 101 is progressively taken up into the casing by the difference between the circumferential lengths of the inner and outer peripheries of the body of wound tape 20*a*. By thus taking in the surplus tape through the utilization of the rotation of the pinch roller 66, this winding-in operation can be carried out rapidly in a short time. Furthermore, since the rotational speed of the pinch roller 66 is constant, the magnetic tape 20 is wound with uniform winding force around the body of wound tape 20*a*. A further advantageous feature is that this tape winding-in operation can be carried out easily and smoothly without damaging the tape.

The invention will now be described further with respect to a third embodiment of an endless-tape cartridge according thereto with reference to FIGS. 11 and 12, in which parts which are the same as or equivalent to those in the endless-tape cartridge shown in FIGS. 1 through 4 are designated by like reference numerals. Description of such parts common to the two embodiments will not be repeated.

The endless-tape cartridge of the instant embodiment is similar to the cartridge 10 of the aforedescribed first embodiment except for the addition of a guide plate 111 for guiding the tape which is being drawn out. This guide plate 111 is formed by bending a sheet of a resilient synthetic resin of relatively small thickness dimension of the order of 0.2 mm., for example. One end of this guide plate 111 is fixed to the lower surface of the upper half 11*a* of the casing, while the other free end is superimposed over the upper surfaces of the hub 18*a* of the spool 18 and the body of wound tape 20*a* in plan view. Moreover, it is inclined in side view, thereby being in the vicinity of or lightly contacting these upper surfaces. In the instant embodiment, the guide bar 29 in the aforedescribed first embodiment is omitted.

At the time when the magnetic tape is drawn out from the innermost periphery of the body of wound tape, the tape which should be drawn out of the innermost periphery of the wound tape body rotates together with the body of wound tape. The tape is no longer drawn out smoothly from a specific position because of uneven winding force in the wound tape body, friction between the tape and the spool hub, and the rotational inertia of the wound tape body.

This undesirable occurrence is prevented by the provision of the guide plate 111 in the instant embodiment. More specifically, the tape 20 which should be drawn out but which otherwise tends to rotate together with the body of wound tape 20*a* makes contact with the free tip of the guide plate 111 for drawing out the tape and thereby is drawn out from the body of wound tape. Accordingly, the magnetic tape 20 is drawn out positively from the body of wound tape 20*a*. The tape cannot go deeper than the position of the guide plate 111 (i.e., further in the rotational direction of the body wound tape.)

The free tip of the guide plate 111 is so disposed at a position which is advanced in the direction of rotation of the body of wound tape 20*a* from the above mentioned specific position for drawing out the tape. The free tip does not make contact with the magnetic tape 20 in the case where the tape of innermost periphery of the body of wound tape 20*a* is being drawn out from the specific position. Furthermore, it will be apparent that this guide plate 111 may also be provided in the endless-tape cartridge 100 of the aforedescribed second embodiment.

A fourth embodiment of the invention will now be described in conjunction with FIGs. 13, 14A and 14B. Parts in FIG. 13 which are the same as or equivalent to those of the endless-tape cartridge illustrated in FIG. 1 are designated by like reference numerals, but detailed description thereof will not be repeated.

The side flange wall of the lower half 11*b* of the casing of the endless-tape cartridge of this embodiment is provided at one part on its inner surface with a projecting base 121, onto which one end of a spring member 122 of thin sheet form is anchored. This spring member 122 is made of a material such as Mylar of a thickness of the order of 0.2 mm., for example. It is curved toward the peripheral edge of the flange 18*c* formed integrally and coaxially with the hub 18*a* of the spool around which the body of wound tape 20*a* is wound. The peripheral edge of the flange 18*c* is provided with ratchet teeth 123, against which the spring member 122 is continually and lightly pressed by its elastic spring force.

During normal use of the cartridge 120, the body of wound tape 20*a* and the spool flange 18*c* rotate in the regular conterclockwise direction. When the spool flange 18*c* rotates in the counterclockwise direction, the free end of the spring member 122 rides over the ratchet teeth 123 as indicated in FIG. 14A. For this reason, the flange 18*c* rotates smoothly and without being hindered by the spring member 122.

On the other hand, when the cartridge 120 is not being used, and the flange 18*c* is urged to rotate in the clockwise direction, the free end of the spring member 122 assumes a state of engagement with the ratchet teeth 123 wherein it is biting into a recessed valley between two teeth as indicated in FIG. 14B. Consequently, the spool flange 18*c* is locked by the spring member 122 and prevented from undergoing reverse rotation in the clockwise direction.

The reverse rotation preventing mechanism of this embodiment can be used in place of the reverse rotation preventing mechanism comprising the eccentric roller 33 and related members in the aforedescribed first embodiment.

Further, this invention is not limited to these embodiments but various variations and modifications may be made without departing from the scope and spirit of the invention.

What I claim is:

1. An endless-tape cartridge for use in a recording and/or reproducing apparatus of the type wherein an endless tape is caused to travel obliquely with respect to the rotating plane of a rotary magnetic head for recording and/or reproducing video signals, said cartridge comprising: a cartridge casing; a spool rotatably accommodated within said casing; a body of wound tape of an endless-tape wound around said spool and disposed in the lower half part of the casing; a first guide member for guiding a tape portion drawn out of the innermost periphery of said body of wound tape to a high position higher than the position of the body of wound tape; a tape outlet provided in a side wall of the casing at a position of the same height as said high position such that said tape guided by said first guide member can move out of the casing at said high position; a tape inlet provided in a side wall of the casing at a position lower than said high position such that the tape which has moved out of said tape outlet can enter into the casing at the same high position as the body of wound tape; and a second guide member for guiding the tape which has thus entered through said tape inlet in such a manner that it is wound around the outermost periphery of the body of wound tape, said endless tape drawn out of the casing through the tape outlet being held between a capstan and a pinch roller of said recording and/or reproducing apparatus and thereby being driven and caused to travel, and said first guide member being disposed above and coaxially with said second guide member.

2. An endless-tape cartridge for use in a recording and/or reproducing apparatus of the type wherein an endless tape is caused to travel obliquely with respect to the rotating plane of a rotary magnetic head for recording and/or reproducing video signals, said cartridge comprising: a cartridge casing; a spool rotatably accommodated within said casing, a body of wound tape of an endless-tape wound around said spool and disposed in the lower half part of the casing; a first guide member for guiding a tape portion drawn out of the innermost periphery of said body of wound tape to a high position higher than the position of the body of wound tape; a tape outlet provided in a side wall of the casing at a position of the same height as said high position such that said tape guided by said first guide member can move out of the casing at said high position; a tape inlet provided in a side wall of the casing at a position lower than said high position such that the tape which has moved out of said tape outlet can enter into the casing at the same high position as the body of wound tape; a second guide member for guiding the tape which has thus entered through said tape inlet in such a manner that it is wound around the outermost periphery of the body of wound tape, said endless tape drawn out of the casing through the tape outlet being held between a capstan and a pinch roller of said recording and/or reproducing apparatus and thereby being driven and caused to travel; a freely rotatable idler for pressing against said pinch roller of said recording and/or reproducing apparatus and against said first guide member, said first guide member being a freely rotatable guide roller pressed against said pinch roller by way of said idler thereby to be driven in rotation by the rotational power of the pinch roller transmitted by way of the idler thereby to drive said tape in traveling movement between said idler and said guide roller, said body of wound tape being rotated by the driving and drawing out of the tape by said guide roller and said idler and thereby to accomplish, through differential winding action of said innermost and outermost peripheries thereof, a taking up of the surplus slack tape outside of the casing and a drawing thereof into the casing.

3. The endless-tape cartridge as claimed in claim 2 in which said idler is disposed in a position confronting said tape inlet provided in the casing, and said tape inlet is so formed that a portion of said pinch roller projects thereinto to press against said idler.

4. An endless-tape cartridge for use in a recording and/or reproducing apparatus of the type wherein an endless tape is caused to travel obliquely with respect to the rotating plane of a rotary magnetic head for recording and/or reproducing video signals, said cartridge comprising: a cartridge casing; a spool rotatably accommodated within said casing; a body of wound tape of an endless-tape wound around said spool and disposed in the lower half part of the casing; a first guide member for guiding a tape portion drawn out of the innermost periphery of said body of wound tape to a high position higher than the position of the body of wound tape; a tape outlet provided in a side wall of the casing at a position of the same height as said high position such that said tape guided by said first guide member can move out of the casing at said high position; a tape inlet provided in a side wall of the casing at a position lower than said high position such that the tape which has moved out of said tape outlet can enter into the casing at the same high position as the body of wound tape; a second guide member for guiding the tape which has thus entered through said tape inlet in such a manner that it is wound around the outermost periphery of the body of wound tape, said endless tape drawn out of the casing through the tape outlet being held between a capstan and a pinch roller of said recording and/or reproducing apparatus and thereby being driven and caused to travel; an eccentric roller rotatably supported with eccentricity in a position to contact the outer periphery of a flange of said spool within the casing and having an outer circumferential surface of a high coefficient of friction, said eccentric roller being adapted to rotate in directions such that at the time of rotation of said flange in a regular direction, a portion of the outer circumferential surface other than the large-diameter part of the eccentric roller is in contact with the outer periphery of the flange and, at the time of rotation in the reverse direction, said large-diameter part being in contact with said outer periphery thereto to impart a braking force to said flange.

* * * * *